United States Patent
Rathinasamy et al.

(10) Patent No.: US 12,535,869 B2
(45) Date of Patent: Jan. 27, 2026

(54) DYNAMIC CONFIGURATION AND CORRECTION OF POWER BUDGET TABLE FOR PCIE CARDS

(71) Applicant: Dell Products L.P., Round Rock, TX (US)

(72) Inventors: Shree Rathinasamy, Round Rock, TX (US); Parminder Singh Sethi, Ludhiana (IN)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 18/476,854

(22) Filed: Sep. 28, 2023

(65) Prior Publication Data

US 2025/0110537 A1  Apr. 3, 2025

(51) Int. Cl.
*G06F 1/26* (2006.01)
*G06F 1/28* (2006.01)

(52) U.S. Cl.
CPC ............... *G06F 1/266* (2013.01); *G06F 1/28* (2013.01)

(58) Field of Classification Search
CPC .................................. G06F 1/266; G06F 1/28
See application file for complete search history.

(56) References Cited

U.S. PATENT DOCUMENTS

| | | | |
|---|---|---|---|
| 2006/0123165 A1* | 6/2006 | Narad | G06F 13/4081 710/104 |
| 2010/0131440 A1* | 5/2010 | Chen | G06F 9/44505 706/15 |
| 2018/0004787 A1* | 1/2018 | Kunnathur Ragupathi | G06F 16/2282 |
| 2023/0027000 A1* | 1/2023 | Ayyaswamy | G06F 3/0607 |

* cited by examiner

*Primary Examiner* — Jaweed A Abbaszadeh
(74) *Attorney, Agent, or Firm* — Jackson Walker L.L.P.

(57) ABSTRACT

Disclosed systems and methods determine a current configuration of an information handling system and execute a suitable classification algorithm to classify configurations of other information handling systems as either matching or not matching the current configuration. The current configuration may be determined based on telemetry data generated by the information handling system. The telemetry data may be uploaded to a backend configuration store. After classifying matching and not-matching configurations, a conformal prediction framework may then be invoked to determine one of the matching configurations as the best matching or closest configuration to the current configuration. Recommended values for one or more configuration features may then be determined based on the closest configuration. The recommend values may then be applied to the one or more configuration features.

14 Claims, 2 Drawing Sheets

| Service Tag | Location | Device | Configuration | Match found | Match % |
|---|---|---|---|---|---|
| ST12CVB | Austin | XYZ | (......) | Y | 59 |
| MN22PQR | Chennai | PMN | (......) | N | 0 |
| OL63ERT | China | IUY | (......) | Y | 10 |

400

500

| Card Type | Vendor | Description | PCI VID | PCI DID | PCI SVID | PCI SDID | Peak Power | TDP Power | Temp 1 target | Critical Temp 1 Limit |
|---|---|---|---|---|---|---|---|---|---|---|
| | | | | | | | | | | |
| GPGPU | Nvidia | Nvidia H100 PCIe 80GB | 0x10DE | 0x2331 | 0x10DE | 0x1626 | 634 | 350 | 80 | 88 |

DYNAMIC CONFIGURATION AND CORRECTION OF POWER BUDGET TABLE FOR PCIE CARDS

TECHNICAL FIELD

The present disclosure pertains to management of information handling systems and, more particularly, management of power allocation and power consumption within an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include at least one and frequently two or more Peripheral Component Interconnect Express (PCIe) add-in cards. PCIe add-in cards are so pervasive that at least some power budgeting methodologies identify PCIe add-in card power as one of the three primary components of power consumption and power budgeting management. See, e.g., *ATX Version 3.0 Multi Rail Desktop Platform Power Supply Design Guide*, Rev. 2.1 (Intel 2023).

PCIe cards are designed to meet specifications for various thermal parameters including, as examples, thermal qualification temperatures, maximum operating temperatures, hardware slowdown temperatures, hardware shutdown temperatures, etc. PCIe thermal parameters are mission critical crucial parameters that must be rigorously monitored and managed. Server class systems in data centers and other large scale compute environments may include a system management resource, such as a baseboard management controller (BMC), that utilizes a data structure commonly referred to as power budge table (PBT) to provide thermal and power consumption management for PCIe resources.

In at least some environments, the PBT values for a PCIe card are entered manually in accordance with data from specification sheets and other reliable sources. Manual entry of PBT values is inherently error-prone. Errors in PBT values may have significant consequences and may negatively impact the performance and/or availability of impacted systems. In addition, PBT modifications are typically implemented only during BMC firmware updates, which may delay the implementation of any PBT modifications.

An incorrect value in a PBT may have negative consequences. For example, if the device identifier (DID), vendor identifier (VID), etc. for a card is incorrect, the PBT may read the incorrect value and make an incorrect identification of the PCIe card. This may lead to incorrect temperature and cooling values for a PCIe card, which can result in damage to the PCIe card, server system, etc. As another example, an incorrect PBT value for a critical parameter, e.g., critical temperature, slowdown temperature, etc., can prompt a platform's BMC to take an incorrect course of action. As an illustrative example, incorrect entries in the PBT of a server provisioned with a graphics processing unit (GPU) card might cause the BMC to operate the system fans at 100% capacity, regardless of whether the GPU itself was operating below the recommended temperature. This could result in a violation of a customer's acoustic threshold due to excessive noise produced by the fans.

More generally, issues that may arise due to incorrect PBT entries include loss in revenue, low customer satisfaction, increase in support calls to support, rework of PBT entries and associated testing of PCIe cards.

SUMMARY

Subject matter set forth below discloses a framework for proactively assessing, recommending, and correcting PBT values and applying those value in the applicable server(s).

Thermal specifications for PCIe cards including, as examples, thermal qualification temperature, maximum operating temperature, hardware slowdown temperature, hardware shutdown temperature, etc. are crucial parameters that must be monitored and managed. Typically, these parameters are managed by a management controller in combination with a PBT. If, however, an incorrect value is entered into the PBT due to manual error, the error may be remain undetected until an issue is reported in the field. Disclosed subject matter addresses issues arising from faulty PBT entries for PCIe devices in a server.

A disclosed power management framework detects a server's current configuration, intelligently formulates appropriate PBT values, and proactively recommends the values to the administrator or other user when the applicable value is being entered into the PBT.

Disclosed features enable dynamic PBT value remediation for on-the-fly correction of erroneous entries. This eradicates PCIe device performance degradation and failures, subsequently addressing loss in revenue, low customer satisfaction, increase in calls to support, rework of PBT entries and associated testing of PCIe cards.

In one aspect, disclosed systems and methods for managing an information handling system determine a current configuration of an information handling system and execute a naïve Bayer classifier or another suitable classification algorithm to classify configurations of other information handling systems as either matching or not matching the current configuration.

Determining the current configuration may include determining the current configuration based on telemetry data generated by the information handling system. In addition, the telemetry data may be uploaded to a backend configuration store associated with an original equipment manufacturer (OEM) of the information handling system. Similarly, the configurations of other information handling systems may include configurations uploaded to the configuration store from the other information handling systems.

After classifying matching and not-matching configurations, a conformal prediction (CP) framework may then be invoked to determine one of the matching configurations as the best matching or closest configuration to the current configuration. Recommended values for one or more configuration features may then be determined based on the closest configuration. The recommend values may then be applied to the one or more configuration features.

The information handling system may include one or more PCIe cards and determining the current configuration may refer to or include determining a current PCIe configuration, i.e., the current configurations of the one or more PCIe cards. A PCIe card configuration may be indicated by one or more vendor identifier features, one or more device identifier features, and one or more power features. The one or more power features may include, as non-limiting examples, a peak power feature, a thermal design power (TDP) feature, a power break feature. Applying recommended values may include applying the recommended values to the PBT. In addition, applying the recommended values to the PBT may include generating and executing custom Intelligent Platform Management Interface (IPMI) commands to modify the PBT in real time, as opposed to implementing the PBT modifications during the next firmware update of the BMC or other management controller.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figures 1, 2, 3:
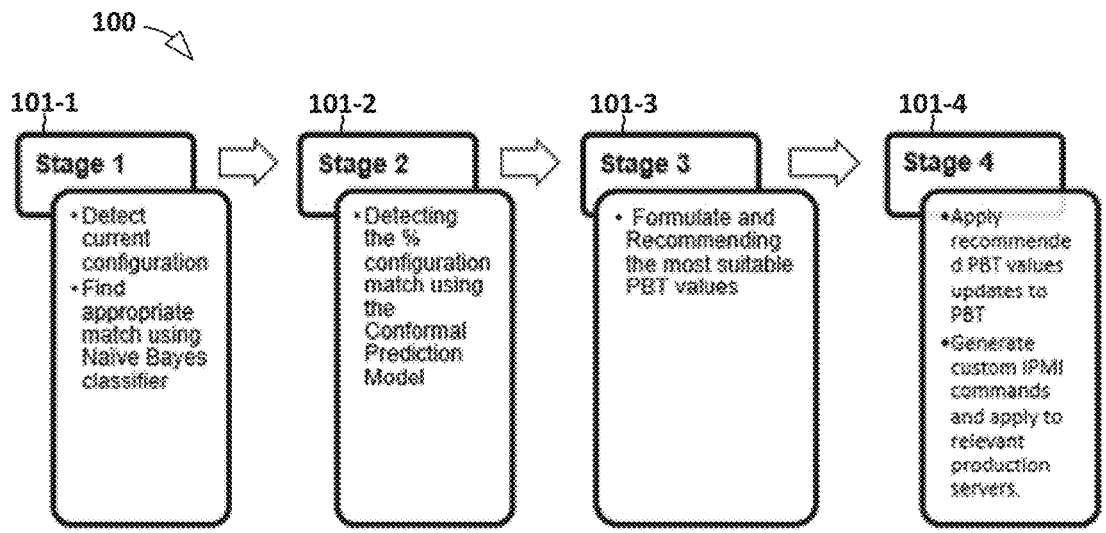
FIG. 1 illustrates a four stage process for managing a PBT in an information handling system.
FIG. 2 illustrates exemplary configuration data for two PCIe cards.
FIG. 3 illustrates classifying configurations of other systems as matching or not matching a current configuration.

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figures 4, 5, 6:
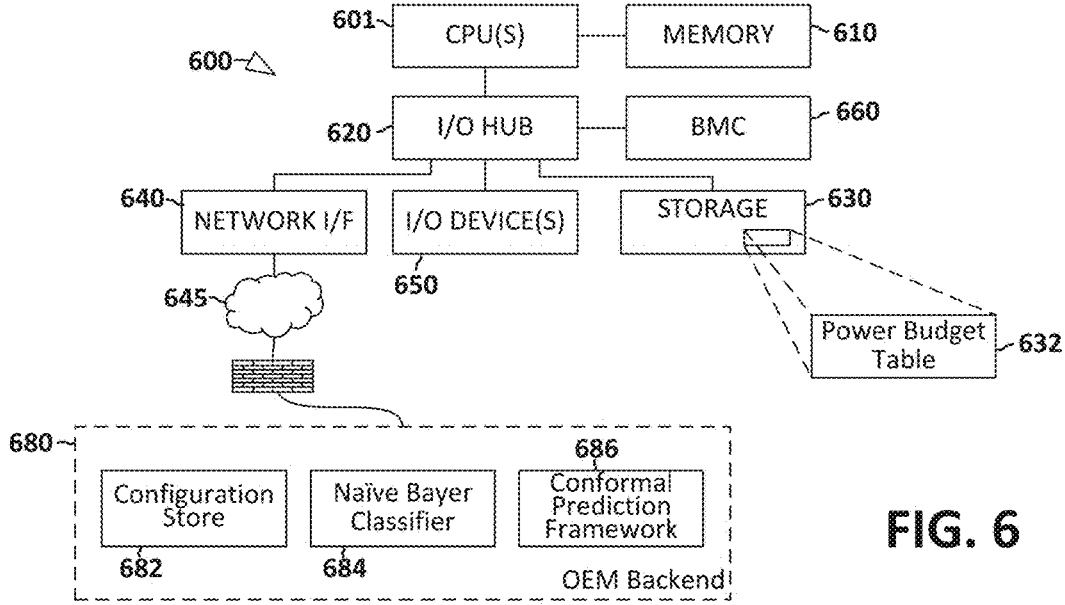
FIG. 4 illustrates determining a best matching configuration.
FIG. 5 illustrates applying recommend PBT values.
FIG. 6 illustrates an exemplary information handling system for use in conjunction with subject matter of FIG. 1 through FIG. 5.

Referring now to the drawings, FIG. 1 illustrates a four stage process 100 for managing PCIe power budget tables for one or more information handling systems. Some or all of the stages 101 illustrated in FIG. 1 may be performed by the applicable information handling system. Although not explicitly depicted in FIG. 1, an exemplary information handling system is depicted in FIG. 6 and described in the accompanying text.

Stage 1—Detecting the current configuration and finding an appropriate matching configuration. The first stage 101-1 depicted in FIG. 1 determines a current configuration of an information handling system and invokes a classification algorithm to identify one or more matching configurations from a configuration database. The configuration database may be divided into two parts including a feature matrix and a response vector. The feature matrix may include configuration vectors in which each vector consists of values for one or more features. Examples of features include 'number of fans', 'number of PCI cards', 'type of PCIe card', etc. The response vector contains the value of a class variable for each row of the feature matrix, wherein the class variable indicates whether the applicable entry in the feature matrix matches the current configuration.

Embodiments may utilize telemetry to determine the current configuration and/or identify matching configurations. In some implementations, various management and telemetry resources may be leveraged to collect device telemetry and upload it to the OEM's backend.

Telemetry, in the context of the present disclosure, encompasses automated processes for making measurements and collecting other data at remote or inaccessible points and transmitting the data to a centralized store for monitoring and analysis. Telemetry data may include configuration data indicative of settings for various information handling resources including, as non-limiting examples, basic input/output system (BIOS) resources, baseboard management controller (BMC) resources, network interface controller (NIC) resources, etc. Telemetry may further encompass inventory data, including server hardware and firmware reporting, performance telemetry indicating performance metrics for central processing units (CPUs), memory bandwidth, and I/O usage. Telemetry may also include system even log (SEL) information, sensor data indicating, as examples, voltages, temperatures, power, connectivity status, and intrusion detection information.

IT administrators may leverage telemetry from their infrastructures to monitor operations, generate alerts, and the like using, as examples, Simple Network Management Protocol (SNMP) alerts and/or Intelligent Platform Management Interface (IPMI) traps. In addition, telemetry data may drive AI-based analytics to gain operational insight into datacenter operations, enabling IT administrators to proactively manage by analyzing trends and discovering relationships between seemingly unrelated events and operations.

In at least some embodiments, an information handling system may include telemetry resources enabling and/or supporting granular, precisely time-stamped, time-series data to facilitating telemetry streaming that is more efficient than legacy polling techniques. In such embodiments, the information handling system may be a server-class system including a BMC or another system management resource provisioned to orchestrate telemetry operations. A commercially distributed example of such of system is a PowerEdge series server provisioned with an integrated Dell Remote Access Controller 9 (iDRAC9) and an iDRAC9 Datacenter license from Dell Technologies.

In at least one embodiment of the process 100 illustrated in FIG. 1, the information handling system is configured to stream telemetry data, including current configuration data, to a backend and/or cloud-based configuration store maintained by an original equipment manufacturer (OEM) of the information handling system. In such an embodiment, the configuration store may include configuration data streamed from telemetry resources of all customers and users of the OEM's systems, resulting in a potentially enormous database of configuration information for thousands of information handling systems.

For embodiments suitable for managing PCIe resources, the configuration information detected in first stage 101-1 may include PCIe configuration information indicative of various parameters pertaining to the system's PCIe cards and other PCIe resources. PCIe configuration data may include device identifier information, power consumption information, thermal information, and other information.

FIG. 1 illustrates data set examples for NIC and general purpose graphics processing unit (GPGPU) PCIe cards on a server. The above data may be collected either from customer machines or internal test machines.

In at least one embodiment, first stage 101-1 generated configuration data may be the various similar configurations with their classification of either matching with the existing configuration or not.

FIG. 2 illustrates exemplary PCIe configuration data 200 generated as the output of first stage 101-1. The illustrated PCIe configuration data 200 is indicative of the system's current configuration and, more specifically, the system's current PCIe configuration for a hypothetical information handling system provisioned with PCIe resources including a PCIe NIC and a PCIe GPGPU. The illustrated configuration data includes a first vector 210-1 corresponding to the PCIe NIC and a second vector 210-2 for the PCIe GPGPU. Each vector 210 includes values for a number of features or fields 220 including device and vendor identifier fields, power consumption fields, and temperature fields. Specifically, the vectors 210 illustrated in configuration data 200 include a card type field 220-1, a vendor field 220-2, a description field 220-3, a PCI vendor identifier (VID) field 220-4, a PCI device identifier (DID) field 220-5, a PCIe subsystem vendor identifier (SVID) field 220-6, a PCIe subsystem device identifier (SDID) field 220-7, a peak power field 220-8, a thermal design parameter (TDP) field 220-9, a first temperature target field 220-10, and a critical temperature limit field 220-11. Although FIG. 2 depicts a specific combination pf fields 220 in each vector 210, those of ordinary skill will appreciate that the depicted record is exemplary and that other implementations may include more, fewer, and/or different fields 220 in each record 210.

In addition to identifying a system's current configuration, first stage 101-1 of the process 100 depicted in FIG. 1 finds, within the configuration database, one or more matching configurations for the current configuration. The configuration database may include a large number of configuration data vectors corresponding to a large number of information handling systems. For example, a configuration database maintained by an OEM may include configuration vectors for any system manufactured or distributed by the OEM.

The identification of matching configurations may include searching the configuration database using a suitable classification algorithm such as a naïve Bayer classifier. Naïve Bayes classifiers construct models that assign class labels to instances, each of which is represented as a vector of feature values. For the configuration data 200 depicted in FIG. 2, the identification of matching configurations may generate matching configuration data exemplified by the matching configuration data 300 illustrated in FIG. 3. The matching configuration data 300 of FIG. 3 includes system records 310-1 through 310-3, each of which comprises a vector of system features 320-1 through 320-5 wherein one of the features is a class variable indicating whether the corresponding system matches the current configuration. The system features 320 of each system record 310 include a service tag feature 320-1 indicating a value for a service tag affixed to the system, a location feature 320-2 indicating a geographical location of the system, a device model feature 320-3 indicating the applicable model, a configuration feature 320-4, and a match found feature 320-5. The configuration feature 320-4 depicted in FIG. 3 may represent a configuration record of the same type as the records 210 of the configuration data 200 depicted in FIG. 2. The match found feature 320-5 is a class variable indicating whether the corresponding system matches or does not match the current configuration. In this respect, the match found feature 320-5 depicted in FIG. 3 is an example of the previously referenced response vector. As depicted in FIG. 3, the systems corresponding to system records 310-1 and 310-3 have been identified as matching the current configuration while system record 310-2 has been identified as not matching the current configuration.

Stage 2—Determining a percentage match using a Conformal Prediction (CP) Framework. The second stage 101-2 illustrated in FIG. 1 employs a CP machine learning framework to determine a match percentage, indicating a degree of match between the current configuration and one or more matching configurations identified during first stage 101-1. The CP framework may provide a comparative indicator for each matching configuration for purposes of choosing among the matching configurations and recommending suitable PBT values.

Generally, CP frameworks produce multi-value prediction regions. Specifically, given a test pattern X_i and a significance level $\in$, a conformal predictor provides a prediction region $\Gamma(\in/i)$ that contains y_i with probability 1–$\in$.

In at least some embodiments, the percentage match value produced by the CP framework indicates confidence and credibility, wherein confidence refers to an indication of the quality of the prediction and credibility refers to an indication of the quality of the data on which decisions are based. The credibility measure provides a filter mechanism with which certain predictions can be rejected.

In at least one embodiment, second stage 101-2 may generate percentage match data exemplified by the percentage match data 400 depicted in FIG. 4. The percentage match data 400 illustrated in FIG. 4 includes, in addition to all of the information in matching configuration data 300 of FIG. 3, a match percentage feature 420-6 indicating a matching percentage for each record 410 included in percentage match data 400. In at least some embodiments, each value of match percentage feature 420-6 is calculated using the CP framework with random forest in place.

Within the percentage match data 400 illustrated in FIG. 4, the match percentage feature 420-6 indicates, in at least some embodiments, a CP-based score of the "match" value indicated in match found feature 420-5. Specifically, the value of 59% in the match percentage feature 420-6 of record 410-1 represents an assessment of the match prediction, indicated by the "Y" value in match found feature 420-5, for the configuration of the system with service tag ST12CVB, while the value of 10% in the match percentage feature 420-6 of record 410-3 represents an assessment of the match prediction for the configuration of the system with service tag OL83ERT. With respect to the configuration of the system with service tag MN22PQR, corresponding to the second record 410-2 in FIG. 4, the 0% match percentage illustrated in FIG. 4 is consistent with the prediction of no match found, i.e., the "N" value in match found feature 420-5, with the current configuration.

In this manner, second stage 101-2 outputs a match percentage value for each of the various matching configurations identified in first stage 101-1, wherein the match percentage is calculated using the CP framework with random forest in place.

Stage 3—Recommending the most suitable PBT values. The third stage 101-3 illustrated in FIG. 3 is driven by the output of second stage 101-2. In at least some embodiments, third stage 101-3 includes selecting the system/configuration with the highest percent match value, determined in second stage 101-2, retrieving PBT values for the system/configuration, and proactively providing the retrieved PBT values as a recommendation back to an IT administrator.

FIG. 5 illustrates exemplary configuration recommendation data 500 including a first record 510-1 indicating PBT values recommended for a current configuration and a second record 510-2 indicating PBT values for a matching configuration and, more specifically, the matching configuration with the highest match percent value identified by the framework as discussed above with respect to first and second stages 101-1 and 101-2.

Stage 4—Applying Recommended PBT Values to PBT.

During the fourth stage 101-4 illustrated in FIG. 1, the PBT values generated during previously discussed third stage 101-3, in conjunction with approval from an IT administrator, are applied to a PBT associated with a system or systems under consideration. In at least some embodiments, fourth stage 101-4 includes generating IPMI commands customized to implement the recommended PBT values and executing the customized IPMI commands in conjunction with the applicable system to apply the PBT values. Employing customized IPMI commands to modify PBT tables in the applicable systems eliminates undesirable delay that typically precedes conventional PBT modification processes in which PBT updates are not programmed into the systems until the next release of firmware for the system's BMC or other management resource.

Referring now to FIG. 6, any one or more of the elements illustrated in FIG. 1 through FIG. 5 may be implemented as or within an information handling system exemplified by the information handling system 600 illustrated in FIG. 6. The illustrated information handling system includes one or more general purpose processors or central processing units (CPUs) 601 communicatively coupled to a memory resource 610 and to an input/output hub 620 to which various I/O resources and/or components are communicatively coupled. The I/O resources explicitly depicted in FIG. 6 include a network interface 640, commonly referred to as a NIC (network interface card), storage resources 630 including a PBT 632, and additional I/O devices, components, or resources 650 including as non-limiting examples, keyboards, mice, displays, printers, speakers, microphones, etc. The illustrated information handling system 600 includes a baseboard management controller (BMC) 660 providing, among other features and services, an out-of-band management resource which may be coupled to a management server (not depicted). In at least some embodiments, BMC 660 may manage information handling system 600 even when information handling system 600 is powered off or powered to a standby state. BMC 660 may include a processor, memory, an out-of-band network interface separate from and physically isolated from an in-band network interface of information handling system 600, and/or other embedded information handling resources. In certain embodiments, BMC 660 may include or may be an integral part of a remote access controller (e.g., a Dell Remote Access Controller or Integrated Dell Remote Access Controller) or a chassis management controller.

Information handling system 600 is illustrated in FIG. 6 communicatively coupled, via network interface 640 and network 645, to a secure OEM backend 680. The OEM backend 680 depicted in FIG. 6 includes a configuration store 682, a classification algorithm module exemplified in FIG. 6 by a naïve Bayer classifier 684, and a CP framework 686, each of which is suitable for use in conjunction with the various stages 101 of the management process 100 depicted in FIG. 1.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method of managing an information handling system, the method comprising:
    determining a current configuration of an information handling system, wherein the information handling system includes one or more Peripheral Component Interconnect Express (PCIe) cards and wherein determining the current configuration comprises determining a current PCIe card configuration for the one or more PCIe cards;
    executing a classification algorithm to classify other PCIe card configurations, comprising PCIe card configurations of other information handling systems as either matching or not matching the current PCIe card configuration;
    determining, with a conformal prediction framework, percentage match data including a percentage match value for each of the other PCIe card configurations identified as matching and selecting, based on the percentage match data a closest configuration, wherein the closest configuration corresponds to other PCIe configuration with the highest percentage match value;
    determining, based on the closest configuration, recommended values for one or more configuration features; and
    applying the recommended values to the one or more configuration features, wherein applying the recommended values comprises applying one or more of the recommended values to a PCIe power budget table (PBT) of the information handling system, wherein applying the recommended values to the PCIe PBT comprises generating and executing custom Intelligent Platform Management Interface (IPMI) commands to modify the PBT.

2. The method of claim 1, wherein PCIe card configurations are indicated by one or more vendor identifier features, one or more device identifier features, and one or more power features.

3. The method of claim 2, wherein the one or more power features include a peak power feature and a thermal design power (TDP) feature.

4. The method of claim 1, wherein determining the current configuration comprises determining the current configuration based on telemetry data generated by the information handling system.

5. The method of claim 4, further comprising uploading the telemetry data to a configuration store associated with an original equipment manufacturer (OEM) of the information handling system.

6. The method of claim 5, wherein the configurations of other information handling systems comprise configurations uploaded to the configuration store from the other information handling systems.

7. The method of claim 1, wherein the classification algorithm comprises a naïve Bayes classifier.

8. An information handling system comprising:
    a central processing unit (CPU);
    a non-transitory computer readable medium including processor executable instructions that, when executed by a processor, cause the information handling system to perform operations including:
        determining a current configuration of an information handling system, wherein the information handling system includes one or more Peripheral Component Interconnect Express (PCIe) cards and wherein determining the current configuration comprises determining a current PCIe card configuration for the one or more PCIe cards;
        executing a classification algorithm to classify other PCIe card configurations, comprising PCIe card configurations of other information handling systems as either matching or not matching the current PCIe card configuration;
        determining, with a conformal prediction framework, percentage match data including a percentage match value for each of the other PCIe card configurations identified as matching and selecting, based on the percentage match data a closest configuration, wherein the closest configuration corresponds to other PCIe configuration with the highest percentage match value;
        determining, based on the closest configuration, recommended values for one or more configuration features; and applying the recommended values to the one or more configuration features, wherein applying the recommended values comprises applying one or more of the recommended values to a PCIe power budget table (PBT) of the information handling system wherein applying the recommended values to the PCIe PBT comprises generating and executing custom Intelligent Platform Management Interface (IPMI) commands to modify the PBT.

9. The information handling system of claim 8, wherein PCIe card configurations are indicated by one or more vendor identifier features, one or more device identifier features, and one or more power features.

10. The information handling system of claim 9, wherein the one or more power features include a peak power feature and a thermal design power (TDP) feature.

11. The information handling system of claim 8, wherein determining the current configuration comprises determining the current configuration based on telemetry data generated by the information handling system.

12. The information handling system of claim 11, wherein the operations further include uploading the telemetry data to a configuration store associated with an original equipment manufacturer (OEM) of the information handling system.

13. The information handling system of claim 12, wherein the configurations of other information handling systems comprise configurations uploaded to the configuration store from the other information handling systems.

14. The information handling system of claim 8, wherein the classification algorithm comprises a naïve Bayes classifier.

* * * * *